United States Patent
Tilly

(10) Patent No.: US 12,045,846 B1
(45) Date of Patent: Jul. 23, 2024

(54) SYSTEM AND METHOD OF DEMAND PLANNING FOR SUBSTITUTABLE ITEMS

(71) Applicant: Blue Yonder Group, Inc., Scottsdale, AZ (US)

(72) Inventor: Philippe Jean-Marc Tilly, Scottsdale, AZ (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 15/893,131

(22) Filed: Feb. 9, 2018

Related U.S. Application Data

(60) Provisional application No. 62/458,276, filed on Feb. 13, 2017.

(51) Int. Cl.
| | | |
|---|---|---|
| G06Q 30/00 | (2023.01) | |
| G06F 17/00 | (2019.01) | |
| G06F 17/11 | (2006.01) | |
| G06Q 30/0201 | (2023.01) | |
| G06Q 30/0283 | (2023.01) | |

(52) U.S. Cl.
CPC ......... *G06Q 30/0206* (2013.01); *G06F 17/11* (2013.01); *G06Q 30/0201* (2013.01); *G06Q 30/0283* (2013.01)

(58) Field of Classification Search
CPC ..................... G06Q 10/00–50/00; G06F 17/00
USPC ............................................... 705/7.11–7.42
See application file for complete search history.

(56) References Cited

U.S. PATENT DOCUMENTS

| | | | | |
|---|---|---|---|---|
| 7,660,734 | B1* | 2/2010 | Neal ...................... | G06Q 10/06 705/7.29 |
| 2002/0165760 | A1* | 11/2002 | Delurgio ................ | G06Q 10/04 705/400 |
| 2013/0325556 | A1* | 12/2013 | Kimmerling ...... | G06Q 30/0206 705/7.35 |
| 2014/0172502 | A1* | 6/2014 | Ryks .................. | G06Q 30/0202 705/7.31 |

(Continued)

OTHER PUBLICATIONS

Demand Functions in Decision Modeling: a Comprehensive Survey and Reseach Directions. Jian Huang, Mingming Leng, Mahmut Parlar, Jul. 2012, Decision Sciences, 55 Pages.

(Continued)

*Primary Examiner* — Mustafa Iqbal
(74) *Attorney, Agent, or Firm* — Spencer Fane LLP; Steven J. Laureanti

(57) ABSTRACT

A system and method are disclosed for planning a product assortment based on a sales forecast without using a cross elasticity by receiving a percentage pricing change for at least two substitutable products of an inventory in a supply chain network having one or more supply chain entities, and at least two substitutable products are grouped in the same product category and at least one of at least two substitutable products is grouped in a product assortment, calculating an average percent pricing change for the product category including at least two substitutable products and a direct effect factor and cross-effect factor for each of at least two substitutable products, and identifying an item of at least two substitutable items to be removed from the product assortment based, at least in part, on a substitutable demand calculated by modeling a price increase of a substitutable item to infinity.

14 Claims, 4 Drawing Sheets

(56) References Cited

U.S. PATENT DOCUMENTS

2016/0171592 A1* 6/2016 Pugh .................. G06Q 30/0635
                                                                                     705/26.81
2021/0279753 A1* 9/2021 Saarenvirta .......... G06Q 10/067

OTHER PUBLICATIONS

Price Optimization: Brendan Kitts, Kevin Hetherington-Young, Vignette Corp, pp. 1-63.
Demand models for the static retail price optimization problem—a Revenue Management perspective, Timo Kunz, Sven F. Crone, 1998, ACM, pp. 101-125.
Multi-Product Price Optimization and Competition under the Nested Logit Model with Product-Differentiated Price Sensitivities, Guillermo Gallego, Ruxian Wang, Aug. 1, 2013, pp. 1-28.

* cited by examiner

SYSTEM AND METHOD OF DEMAND PLANNING FOR SUBSTITUTABLE ITEMS

CROSS-REFERENCE TO RELATED APPLICATIONS

The present disclosure is related to that disclosed in the U.S. Provisional Application No. 62/458,276, filed Feb. 13, 2017, entitled "System and Method of Demand Planning for Substitutable Items." U.S. Provisional Application No. 62/458,276 is assigned to the assignee of the present application. The subject matter disclosed in U.S. Provisional Application No. 62/458,276 is hereby incorporated by reference into the present disclosure as if fully set forth herein. The present invention hereby claims priority under 35 U.S.C. § 119(e) to U.S. Provisional Application No. 62/458,276.

TECHNICAL FIELD

The present disclosure relates generally to demand planning and specifically to a system and method of demand planning for items with interdependent demand and pricing relationships.

BACKGROUND

When forecasting sales and demand for an item, demand planners may need to consider not only the price of the item under consideration, but also the prices of substitutable and complementary items, as well. To determine how much sales of an item are affected by a price change of another item, a demand planner can calculate the cross elasticity of demand between the item and every substitutable or complementary item. However, retail forecasts based on cross elasticities are not ideal because even small retailers typically sell hundreds of items and calculating the cross elasticity for more than a few products is inefficient and not easily scalable. These drawbacks of this approach are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
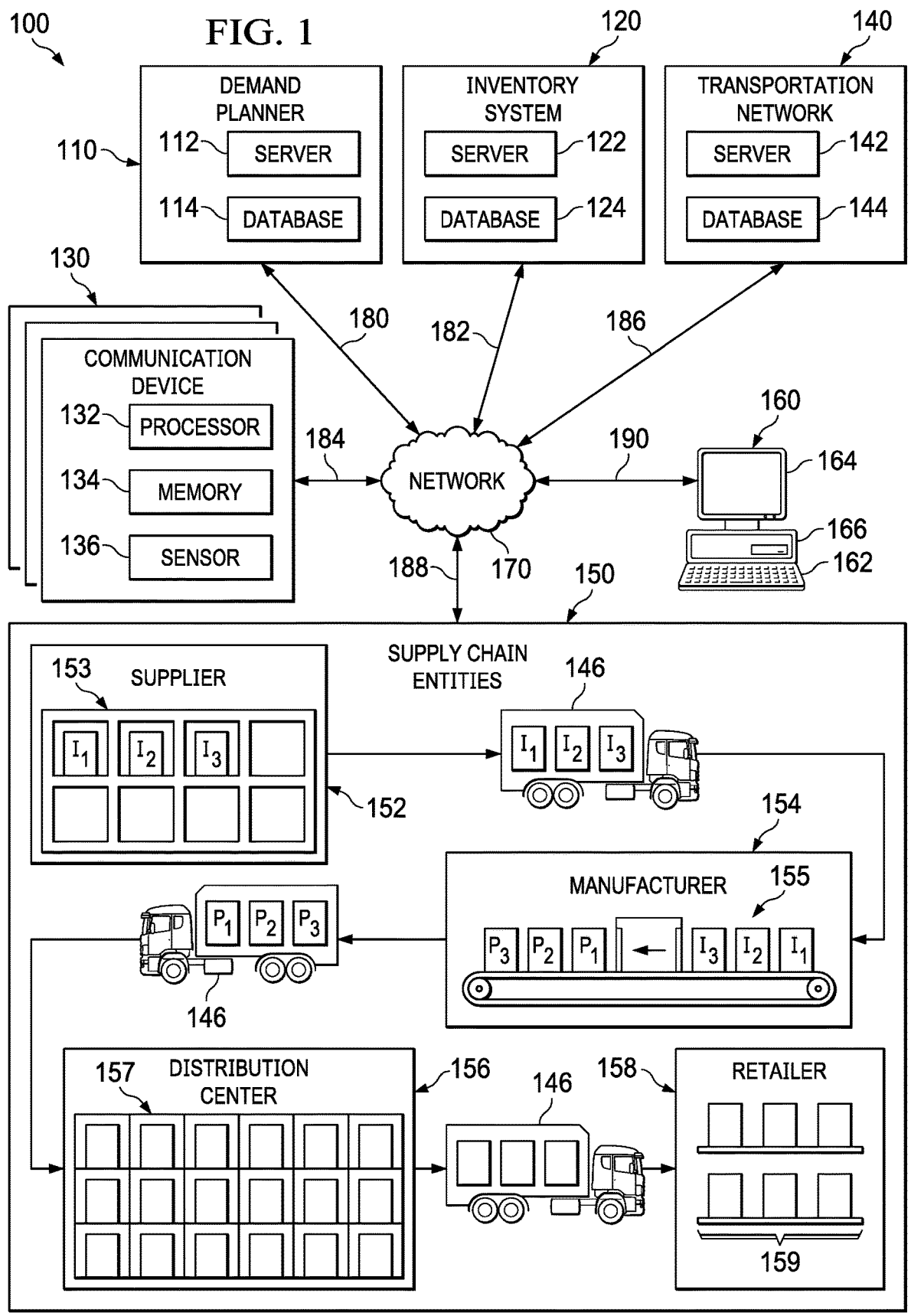
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

One method of forecasting sales comprises determining the effects of price changes by calculating a cross elasticity for every pair of similar products. A cross elasticity is measured as the percentage change in a quantity of demand for a first item in response to a percentage change in price of a second item. For example, if the price of milk increases by 10% and this price increase causes the demand for cereal to decrease by 20%, the cross elasticity of demand may be calculated as −2 (−20%/10%=−2). A negative cross elasticity indicates items that are complements, a positive cross elasticity indicates items that are substitutable, and a cross elasticity of zero indicates items that are independent.

However, calculating every cross elasticity is impractical because retailers often sell a vast number of products and nearly all products are similar to some, if not many, other products. Additionally, because cross elasticities are asymmetric, two calculations must be done for each pair of similar products (i.e. the cross elasticity of A to B is generally different from the cross elasticity of B to A). Therefore, for a group of n products, the number of cross elasticities scales quadratically at $n^2-n$. For a group of ten similar products, ninety cross elasticities must be estimated. For a group of one hundred similar products, a model that includes cross elasticities would be required to estimate 9,900 cross elasticities, which is a significant amount of unnecessary data being processed, thereby leading to extremely impractical and inefficient processing. Some approaches to demand planning attempt to circumvent this scalability issue by estimating the cross elasticity for only a few similar items in a category, often only as few as between three and ten, which leads to a cross elasticities effect at the aggregate level that are statistically noisy, erratic, and unreliable because they are estimated from a noisy and limited dataset. Because the data is generally unreliable and has too few observations of cross effects, any model based on these cross-elasticities inherits these limitations. Models utilizing cross elasticity in this manner are incomplete because they typically disregard 90% or more of item interactions based on the scaling problem described above. When the model and data are aggregated to understand the interaction of items at the level of a category, which may comprise a group of substitutable items, the missing 90% of item interactions prevents determining appropriate category constraints and prevents determining whether an item should be added or removed from a category.

Other models which prove to be impractical for demand planning set a limit on overall units of items and substitutable items at a current or preset volume and current prices. The model is then rerun with various price changes at a constant volume. In this model, the category of items and substitutable items will not grow or shrink, which does not reflect actual sales behavior and, further, does not provide a framework suitable for optimization under an objective. In attempting to remedy the deficiency of the model, demand planners may establish a nesting logic that models interactions of single groups of items with each other and ignores substitution that does not occur between items within the modeled system. With the nesting logic incorporated, these models may show some growth, but the complexity of estimating every single model within the system makes the system difficult to work with, the storage of the large amount of data impractical, and processing time inefficient.

As described more fully below, a demand planner according to one or more of the disclosed embodiments executes a method that forecasts the sales for items in a category based on price changes of an item and one or more substitutable items, while eliminating the need to estimate cross elasticities for each pair of items. The disclosed model comprises a demand model with product interaction due to base price changes which is more accurate than previous models based, at least in part, on the larger amount of data that is processed by the model when compared with models that include estimated cross elasticities. According to one aspect, embodiments of the disclosed model some embodiments of the model provide for category containment based on the modeled item interaction. Additionally, the disclosed model scales linearly with the number of considered items—a category of n items requires calculation of n+1 calculations, which are elasticity estimations for each item's own elasticity (n) and a single calculation of the category elasticity estimation (+1). For example, in a category of ten items, only eleven calculations need to be performed. Therefore, unlike traditional models, the disclosed model allows quickly calculating price elasticity for all items at a retail store and including all product interactions due to prices. Embodiments therefore provide for performing operations on the data to streamline processing and increase processing speed of the computing device. Additionally, the disclosed model is robust enough to maintain the known asymmetry of cross effects, while processing the reduced set of data to increase performance speed.

Furthermore, as discussed in more detail below, the model may be linearized around current prices of items to enable linear programming (LP) optimization of sale prices under business rules constraints. According to embodiments, the model generates prices for retail products that maximize a business objective measure, such as revenue or gross margin. Additionally, the model may be generalized to reach business objectives and define the best price points, based, at least in part, on the historical interaction of the products in a category, so that the business objective measure is maximized under the constraints.

According to a further aspect, the disclosed model provides for determining substitutable demand in an item assortment. As the price of a substitutable item increases to infinity, the disclosed model quantifies the sales transferred to other items. Conversely, when the price elasticity of a new item is known, a demand planner may project the sales and transferred sales caused by adding the new item to the category. Accordingly, embodiments of the disclosed model determine whether to modify the selection of products in a product assortment.

FIG. 1 illustrates an exemplary supply chain network 100 according to a first embodiment. Supply chain network 100 comprises demand planner 110, inventory system 120, one or more communication devices 130, transportation network 140, one or more supply chain entities 150, computer 160, network 170, and communication links 180-190. Although a single demand planner 110, a single inventory system 120, a single communication device 130, a single transportation network 140, one or more supply chain entities 150, a single computer 160, and a single network 170, are shown and described, embodiments contemplate any number of demand planners, inventory systems, imagers, transportation systems, supply chain entities, computers, or networks, according to particular needs.

In one embodiment, demand planner 110 comprises server 112 and database 114. As explained in more detail below, server 112 of demand planner 110 comprises one or more modules to, for example, define item groups and hierarchies, store and transmit product information, and calculate item and group elasticities, price changes, and direct and cross-effect factors. Inventory system 120 comprises server 122 and database 124. Server 122 of inventory system 120 is configured to receive and transmit inventory data, including item identifiers, pricing data, attribute data, inventory levels, and other like data about one or more items at one or more locations in the supply chain network 100. Server 122 stores and retrieves inventory data from database 124 or from one or more locations in supply chain network 100.

According to embodiments, inventory database 124 includes current or projected inventory quantities or states, order rules, or explanatory variables. For example, inventory database 124 may comprise the current level of inventory for each item at one or more stocking points across the supply chain network 100. In addition, inventory database 124 may comprise order rules that describe one or more rules or limits on setting an inventory policy, including, but not limited to, a minimum order quantity, a maximum order quantity, a discount, and a step-size order quantity, and batch quantity rules. According to some embodiments, inventory database 124 may comprise explanatory variables that describe the data relating to specific past, current, or future indicators and the data of promotions, seasonality, special events (such as sporting events), weather, and the like. According to some embodiments, demand planner 110 accesses and stores inventory data in inventory database 124, which may be used by demand planner 110 to place orders, set inventory levels at one or more stocking points, initiate manufacturing of one or more items, or the like. In addition, or as an alternative, inventory data of inventory database 124 may be updated by receiving current item quantities, mappings, or locations from inventory system 120, one or more communication devices 130, transportation system 140, and/or one or more supply chain entities 150.

According to some embodiments, one or more communication devices 130 receive imaging information from one or more sensors 136 or from one or more databases in supply chain network 100. Additionally, one or more communication devices 130 comprise one or more processors 132, memory 134, one or more sensors 136, and may include any suitable input device, output device, fixed or removable computer-readable storage media, or the like. According to embodiments, one or more communication devices 130 identify items near one or more sensors 136 and generate a mapping of the item in supply chain network 100. As explained in more detail below, inventory system 120 and transportation network 140 use the mapping of an item to locate the item in supply chain network 100. The location of the item is then used to coordinate the storage and transportation of items in supply chain network 100 to implement one or more pricing strategies, modification of a product assortment, or meet demand or sales forecasts generated by demand planner 110.

One or more communication devices 130 may comprise a mobile handheld device such as, for example, a smartphone, a tablet computer, a wireless device, or the like. In addition, or as an alternative, one or more communication devices 130 comprise one or more networked communication devices configured to transmit item identity information to one or more databases as an item passes by or is scanned by sensor 136 of one or more communication devices 130. This may include, for example, a stationary scanner located at one or more supply chain entities 150 that identifies items as the items pass near the scanner or a mobile scanner located at one or more supply chain entities 150 that identifies items as the mobile scanner passes by one or more items, such as, for example, a mobile robotic scanner which scans items on store shelves or products in a warehouse. One or more sensors 136 of one or more communication devices 130 may comprise an imaging sensor, such as, a camera, scanner, electronic eye, photodiode, charged coupled device (CCD), or other like sensor that visually detects objects. In addition, or as an alternative, one or more sensors 136 may comprise a radio receiver and/or transmitter configured to read an electronic tag, such as, for example, a radio-frequency identification (RFID) tag. Each of the one or more items may be represented in supply chain network 100 by an identifier, including, for example, Stock-Keeping Unit (SKU), Universal Product C 406ode (UPC), serial number, barcode, tag, RFID, or any other object that encodes identifying information. One or more communication devices 130 may generate a mapping of one or more items in the supply chain network 100 by scanning an identifier or object associated with an item using sensor 136 and identifying the item based, at least in part, on the scan.

Transportation network 140 comprises server 142 and database 144. According to embodiments, transportation network 140 directs one or more transportation vehicles 146 to ship one or more items between one or more supply chain entities 150, based, at least in part, on the mappings of one or more items in supply chain network 100, one or more pricing strategies, modification of a product assortment, or demand or sales forecasts generated by demand planner 110, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with demand planner 110, inventory system 120, one or more communication devices 130, transportation network 140, and/or one or more supply chain entities 150 to identify the location of the transportation vehicle 146 and the location of any inventory or shipment located on the transportation vehicle 146. In addition to the supply chain models, the number of items shipped by transportation vehicles 146 in transportation network 140 may also be based, at least in part, on the number of items currently in stock at one or more supply chain entities 150, the number of items currently in transit in the transportation network 140, a forecasted demand, a supply chain disruption, returned items, and the like.

As shown in FIG. 1, supply chain network 100 operates on one or more computers 160 that are integral to or separate from the hardware and/or software that support demand planner 110, inventory system 120, one or more communication devices 130, transportation network 140, and one or more supply chain entities 150. Supply chain network 100 comprising demand planner 110, inventory system 120, one or more communication devices 130, transportation network 140, and one or more supply chain entities 150 may operate on one or more computers that are integral to or separate from the hardware and/or software that support demand planner 110, inventory system 120, one or more communication devices 130, transportation network 140, and one or more supply chain entities 150. Computers 160 may include any suitable input device 162, such as a keypad, mouse, touch screen, microphone, or other device to input information. Output device 164 may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. One or more processors 166 may execute an operating system program stored in memory to control the overall operation of computer 160. For example, one or more processors 166 control the reception and transmission of signals within the system. One or more processors 166 execute other processes and programs resident in memory, such as, for example, registration, identification or communication and moves data into or out of the memory, as required by an executing process. In addition, or as an alternative, embodiments contemplate executing the instructions on computer 160 that cause computer 160 to perform functions of the method. Further examples may also include articles of manufacture including tangible computer-readable media that have computer-readable instructions encoded thereon, and the instructions may comprise instructions to perform functions of the methods described herein. According to some embodiments, the functions and methods described in connection with one or more communication devices 130 may be emulated by one or more modules configured to perform the functions and methods as described.

In addition, and as discussed herein, supply chain network 100 may comprise a cloud-based computing system having processing and storage devices at one or more locations, local to, or remote from demand planner 110, inventory system 120, one or more communication devices 130, transportation network 140, and one or more supply chain entities 150. In addition, each of the one or more computers 160 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the inventory planer 110, inventory system 120, one or more communication devices 130, transportation network 140, and one or more supply chain entities 150.

These one or more users may include, for example, a "manager" or a "planner" handling demand planning for items with interdependent demand and pricing relationships and/or one or more related tasks within the system. In addition, or as an alternative, these one or more users within the system may include, for example, one or more computers programmed to autonomously handle, among other things, one or more supply chain processes such as demand planning, supply and distribution planning, inventory management, allocation planning, order fulfilment, controlling manufacturing equipment, adjusting various levels of manufacturing and inventory levels at various stocking points and distribution centers 156, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Items may comprise, for example, parts or supplies used to generate products. According to some embodiments, items comprise foods or ingredients. Suppliers 152 may comprise automated distribution systems 153 that automatically transport products to one or more manufacturers 154 based, at least in part, on the mappings of one or more items in the supply chain networks, one or more pricing strategies, modification of a product assortment, or demand or sales forecasts generated by demand planner 110, and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on the mappings of one or more items in the supply chain networks, one or more pricing strategies, modification of a product assortment, or demand or sales forecasts generated by demand planner 110, and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entity 150 in supply chain network 100 and store and transport the product for a second one or more supply chain entity 150. Distribution centers 156 may comprise automated warehousing systems 157 that automatically remove products from and place products into inventory based, at least in part, on the mappings of one or more items in the supply chain networks, one or more pricing strategies, modification of a product assortment, or demand or sales forecasts generated by demand planner 110, and/or one or more other factors described herein.

Retailers 158 may be any suitable entity that obtains one or more products to sell to one or more customers. Retailers 158 may (like the other one or more supply chain entities 150), comprise a corporate structure having a retail headquarters and one or more retail stores. Retail headquarters comprises a central planning office with oversight of one or more retail stores. Retail stores may comprise any online or brick-and-mortar store, including stores with shelving systems 159. This may include, for example, automated robotic shelving machinery that places products on shelves or automated shelving that automatically adjusts based, at least in part, on the mappings of one or more items in the supply chain networks, one or more pricing strategies, modification of a product assortment, or demand or sales forecasts generated by demand planner 110, and/or one or more other factors described herein. Shelving systems 159 may comprise, for example, various racks, fixtures, brackets, notches, grooves, slots, or other attachment devices for fixing shelves in various configurations.

Although one or more supply chain entities 150 are shown and described as separate and distinct entities, the same entity may simultaneously act as more than one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a supply chain network 100 is shown and described, embodiments contemplate any configuration of supply chain network 100, without departing from the scope described herein.

In one embodiment, demand planner 110 may be coupled with network 170 using communications link 180, which may be any wireline, wireless, or other link suitable to support data communications between demand planner 110 and network 170 during operation of supply chain network 100. Inventory system 120 may be coupled with network 170 using communications link 182, which may be any wireline, wireless, or other link suitable to support data communications between inventory system 120 and network 170 during operation of supply chain network 100. One or more communication devices 130 are coupled with network 170 using communications link 184, which may be any wireline, wireless, or other link suitable to support data communications between one or more communication devices 130 and network 170 during operation of distributed supply chain network 100. Transportation network 140 may be coupled with network 170 using communications link 186, which may be any wireline, wireless, or other link suitable to support data communications between transportation network 140 and network 170 during operation of supply chain network 100. One or more supply chain entities 150 may be coupled with network 170 using communications link 188, which may be any wireline, wireless, or other link suitable to support data communications between one or more supply chain entities 150 and network 170 during operation of supply chain network 100. Computer 160 may be coupled with network 170 using communications link 190, which may be any wireline, wireless, or other link suitable to support data communications between computer 160 and network 170 during operation of supply chain network 100.

Although communication links 180-190 are shown as generally coupling one or demand planner 110, inventory system 120, one or more communication devices 130, transportation network 140, one or more supply chain entities 150, and computer 160 to network 170, any of demand planner 110, inventory system 120, one or more communication devices 130, transportation network 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling demand planner 110, inventory system 120, one or more communication devices 130, transportation network 140, one or more supply chain entities 150, and computer 160. For example, data may be maintained locally to, or externally of demand planner 110, inventory system 120, one or more communication devices 130, transportation network 140, one or more supply chain entities 150, and computer 160 and made available to one or more associated users of demand planner 110, inventory system 120, one or more communication devices 130, transportation network 140, one or more supply chain entities 150, and computer 160 using network 170 or in any other appropriate manner. For example, data may be maintained in a cloud database at one or more locations external to demand planner 110, inventory system 120, one or more communication devices 130, transportation network 140, one or more supply chain entities 150, and computer 160 and made available to one or more associated users of demand planner 110, inventory system 120, one or more communication devices 130, transportation network 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, demand planner 110, inventory system 120, communication devices 130, transportation network 140 and/or computers 160 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of products based on mappings of one or more items in supply chain network 100, one or more pricing strategies, modification of a product assortment, demand or sales forecasts generated by demand planner 110, generated plans and policies and/or current inventory or production levels. When the inventory of an item falls to a reorder point, demand planner 110 may then automatically demand or sales forecasts, product mix ratios, inventory levels, production of products of manufacturing equipment, and proportional or alternative sourcing of one or more supply chain entities until the inventory is resupplied to a target quantity.

For example, the methods described herein may include computers 160 receiving product data from automated machinery having at least one sensor and the product data corresponding to an item detected by one or more communication devices 130 of the automated machinery. The received product data may include an image of the item, an identifier, as described above, and/or attributes associated with the item (dimensions, texture, estimated weight, and any other like data). The method may further include computers 160 automatically looking up received product data in a database system associated with demand planner 110, inventory system 120, one or more communication devices 130, and/or transportation network 140 to identify the item corresponding to the product data received from the automated machinery.

The computers may also receive, from the automated machinery, a current location of the identified item. Based on the identification of the item, computers may also identify (or alternatively generate) a first mapping in the database system, where the first mapping is associated with the current location of the item. Computers may also identify a second mapping in the database system, where the second mapping is associated with a past location of the identified item. Computers may also compare the first mapping and the second mapping to determine if the current location of the identified item in the first mapping is different than the past location of the identified item in the second mapping. Computers may then send instructions to the automated machinery based, as least in part, on one or more differences between the first mapping and the second mapping such as, for example, to locate an item to add to or remove from a shelf or inventory of one or more supply chain entities 150 or a shipment to or from one or more supply chain entities 150. In addition, or as an alternative, demand planner 110 monitors the supply chain constraints of one or more items at one or more supply chain entities 150 and adjusts the orders and/or inventory of the one or more supply chain entities 150 based on the supply chain constraints.

Figure 2:
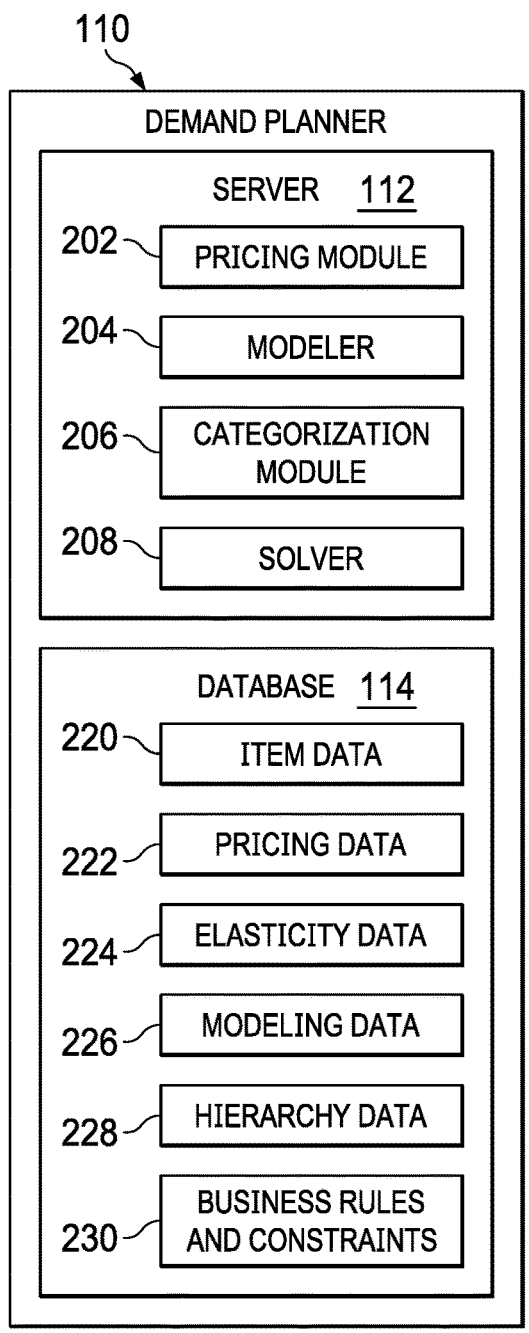
FIG. 2 illustrates the demand planner of FIG. 1 in greater detail in accordance with the first embodiment.

FIG. 2 illustrates demand planner 110 of FIG. 1 in greater detail in accordance with an embodiment. As discussed above, demand planner 110 comprises server 112 and database 114. Although demand planner 110 is shown as comprising a single server 112 and a single database 114, embodiments contemplate any suitable number of servers or databases internal to or externally coupled with demand planner 110. Server 112 of demand planner 110 may comprise pricing module 202, modeler 204, categorization module 206, and solver 208. Although demand planner 110 is illustrated as comprising pricing module 202, modeler 204, categorization module 206, and solver 208, embodiments contemplate any suitable number or combination of these located at one or more locations, local to, or remote from demand planner 110, such as on multiple servers or computers at any location in supply chain network 100.

Pricing module 202 receives, stores, and transmits item data 220, including pricing data and elasticity data, about one or more items. Pricing module 202 may store and retrieve item data in database 114 or one or more databases associated with demand planner 110 or one or more supply chain entities 150. Modeler 204 defines a model based, at least in part, on price changes without estimating cross-price elasticity. According to some embodiments, the model may be stored as modeling data 222 in database 114 or one or more databases associated with demand planner 110 or one or more supply chain entities 150. Models may rely on a perceived price of an item that is influenced by its new price, its current price, and the average percentage price change of substitutable items.

Categorization module 206 may define groups of items to be included in a particular category. According to embodiments, categories represent groupings of substitutable items. For example, a retailer may create categories comprising several substitutable retail products, where a change in the price of one product in the category will interact with the sales of other products in the same category. According to some embodiments, categories are defined in a hierarchy comprising classes and sub-classes, which may be stored as hierarchy data 224 in database 114 or one or more databases associated with demand planner 110 or one or more supply chain entities 150. The classes and sub-classes of the hierarchy comprise groupings of items that are sorted according to their similarity or substitutability with other items. These interactions may be calculated with a model or a calculated estimation of the change in sales based on changes of the different prices.

Solver 208 receives an LP optimization problem and one or more constraints. According to embodiments, the solver calculates base prices under business rules constraints to reach an objective for a given model. Such objectives may include maximizing revenue, profit, and the like.

Database 114 of demand planner 110 may comprise one or more databases or other data storage arrangement at one or more locations, local to, or remote from, server 112. Database 114 comprises, for example, item data 220, pricing data 222, elasticity data 224, modeling data 226, hierarchy data 228, and business rules and constraints 230. Although, database 114 is shown and described as comprising item data 220, pricing data 222, elasticity data 224, modeling data 226, hierarchy data 228, and business rules and constraints 230, embodiments contemplate any suitable number or combination of these, located at one or more locations, local to, or remote from, demand planner 110 according to particular needs.

Item data 220 may comprise any product information such as, for example, attribute information, ingredients, brand, price, promotion, allergy information, inventory availability, identifiers, dimensions, product images, three-dimensional product representations, substitutable products, expiration date, shipping information, lead time, and the like. Pricing data 222 may comprise historical prices, price changes, seasonality data, and the like. Pricing data 222 includes for example, any data relating to past sales, past demand, purchase data, promotions, events, or the like of one or more supply chain entities 150. According to embodiments, pricing data 222 may be stored at time intervals such as, for example, by the minute, hour, daily, weekly, monthly, quarterly, yearly, or any suitable time interval, including substantially in real time. Elasticity data 224 may comprise item elasticity, category elasticity, or other elasticity data.

Modeling data 226 comprises one or more models that determines sales or demand changes based, at least in part, on price changes of items in a category, without estimating cross-price elasticity. According to some embodiments, the model may be stored as modeling data 222 in database 114 or one or more databases associated with demand planner 110 or one or more supply chain entities 150. According to embodiments, hierarchy data 228 comprises categories defined in a hierarchy comprising classes and sub-classes. The classes and sub-classes of the hierarchy comprise groupings of items that are sorted according to their similarity or substitutability with other items. These interactions may be calculated with a model or a calculated estimation of the change in sales based on changes of the different prices. According to embodiments, any number of substitutable products may be grouped into any number of categories according to particular needs. Additionally, the groups of products assigned to particular categories may change over time by adding or removing products from categories based on, for example, changing product attributes, changing customer behavior, miscategorization of products, and the like.

To further illustrate the categorization of a substitutable item, an example is now given. In the following example, a category of products may represent substitutable food items in a grocery store. One possible category for a grocery store is a category of pasta sauces. The category of pasta sauces may include all sauces suitable for serving with any type of pasta. However, such a large category may not accurately capture the substitutability of different pasta sauces. Therefore, pasta sauces may be divided into different categories, such as individual categories for each type of pasta sauce (such as categories that include only marinara sauce, alfredo sauce, pesto, or any other particular types of pasta sauce). The categories for pasta sauce may be based on particular flavors of the sauce (such as categories for garlic-flavored sauces, tomato-flavored sauces, mushroom-flavored sauces, or the like). Categories may include as many or as few items as necessary to accurately group substitutable items into the same category. Although the example of categorization is given in relation to pasta sauces, categories may comprise any group of substitutable items for any type of retailer. For example, the categories of items may represent items at a home improvement store, such as different tools, building supplies, hardware, or the like. By way of a further example, the categories of items for a clothing retailer may represent a particular type of clothing, brand of clothing, segmentation level, or the like.

Additionally, categories may vary between geographic locations and may be chosen at different levels in an enterprise. For example, some retailers may determine categorization of items at the store level, city level, state level, region level, or any other granularity or geographic division, such as a price zone, which may comprise a group of stores in a particular region that all keep the same prices. By setting categorization of items at the store level, the prices may be able to capture different shopping behavior based on the particular neighborhood that the store is located in. The shopping behavior could be influenced by the socio-economic profile of the neighborhood, the particular ethnic diversity of the area, or particular demand and core preferences based on individual behavior, and cultural preferences. For example, within one region, people respond to ice cream differently during various periods depending on the location. The prices for ice cream may change radically for a season whether it is the summer or winter, or whether the store is in San Diego or in Denver.

Business rules and constraints 230 comprise any rules or constraints that may be reflected in an optimization problem to generate a pricing plan, as described in more detail below. According to embodiments, business rules and constraints 230 may be added to the optimization problem to generate prices that incorporate, for example, product interactions, direct effect factors, cross-effect factors, and pricing, margin, size, brand, and competitor constraints.

According to embodiments, retailers set prices for one or more items based on business rules, business constraints, demands, or other like considerations, such as for example, trade contracts with manufacturers, regulations (such as for alcoholic beverages and cars) which may be vastly different based on location, the profit margin the retailer establishes on their products, and other like factors. Regarding business constraints, one such constraint may comprise, for example, setting the price of a large size of a product higher than a small size of the same product. For example, at a grocery store, a large 20 oz. jar or pasta sauce is usually restricted by business constraints to cost more than a 10 oz. jar of pasta sauce to, among other things, prevent shopper dissatisfaction which could be caused by a 20 oz. jar of pasta sauce costing less than a 10 oz. jar of pasta sauce.

When considering prices for retail items, shoppers in retail stores often do not consider only the objective price level of a product, but instead consider the perceived price of an item. Shoppers perceive prices differently based on the prices of similar and nearby products. According to embodiments, embodiments of the disclosed model represent perceived price based, at least in part, on the effective price (including, for example, the labeled price), the current price, the average percentage change in price of substitutable items, and a constant, which may be mathematically derived from the elasticity of an item and the elasticity of the group.

Equation 1 quantifies the perceived price of an item based in part on the prices of substitutable products:

$$\mathcal{P}_i = P_i - \alpha_i \mu \mathbb{P}_i \quad (1)$$

where the perceived price $\mathcal{P}_i$ of item i is influenced by its new price $P_i$, its current price $\mathbb{P}_i$, and the average percentage price change of substitutable items $\mu$, and $\alpha_i$ is a constant for item i that depends on its current elasticity $E_i$ and the group elasticity K according to Equation 2:

$$\alpha_i = 1 - \frac{K}{E_i} \quad (2)$$

After demand planner 110 calculates an item constant $\alpha_i$, demand planner may calculate the perceived price ratio, which indicates a prediction of how the item will change units based on the perceived price. According to embodiments, demand planner 110 estimates the item constant $\alpha_i$ and the category elasticity and item elasticity on which it is based from retail transaction data recorded from item sales, returns, exchanges, or other transaction of one or more retailers for the one or more items in a category.

Accordingly, assuming that the quantity $Q_i$ of the units sales of an item vary based on an exponential function of price, the unit forecast for an item based on differences between the perceived price of an item, the current price of an item, and the quantity ($Q_{B_i}$) of the units of current sales of item i at the current price when substitutable items are at current prices:

$$Q_i = Q_{B_i} \cdot \exp[B_i(\mathcal{P}_i - \mathbb{P}_i)] \quad (3)$$

where $B_i$ is the price elasticity of item i. It relates to price elasticity as the price elasticity of demand is the product of price sensitivity $B_i$ and price $\mathbb{P}_i$.

Equation 3 indicates that, based on perceived prices, shoppers may switch from one item to another when an item has comparable attributes and a significantly lower price. For example, even when a shopper strongly prefers a particular brand, the relative low cost of another item with comparable attributes may convince the shopper to purchase the other product. By way of a further example only and not by way of limitation, an exemplary retail store may sell private label and premium brand merchandise. Private label items (such as store-branded food items, store-branded clothing, and the like) comprise a lower-cost store branded item. Premium brands may comprise higher-cost and higher-quality items (such as name-brand clothing or imported foods or beverages) than the private label items. Even when comprising the same attributes, a shopper may consider a 10% reduction in price on a premium brand item as a greater value than a 10% reduction in price on a store-branded item.

Ordinarily, a premium branded item is perceived as the item to which store-branded or other items are compared to. For example, deodorant is an item for which many name-brand items are sold at retail. A consumer will ordinarily compare name-brand deodorants with the assumption that most are approximately equal in quality. However, when comparing a name-brand deodorant to a private label deodorant, the consumer may believe that, in addition to costing less, the private label deodorant may not last as long, may not smell as good, or otherwise is of lesser quality than the name-brand deodorants. According to embodiments, the disclosed model captures these perceptions by grouping substitutable products in the same category and then determining the change in sales of an item based on price changes for that item and price changes on substitutable items. According to embodiments, demand planner 110 models a forecast of sales of an item that is based on: (1) a category comprising an item and substitutable items; (2) one or more price changes for the item and substitutable items; (3) elasticities of demand for the items in the category; and (4) an elasticity for the category.

According to some embodiments, demand planner 110 models the forecasted sales, according to Equation 4:

$$Q_i = Q_{B_i} \cdot \exp(E_i \delta_i) \cdot \exp[(K - E_i)\mu_i] \quad (4)$$

where $Q_i$ is the units of forecasted sales of item i when its price changes by $100 \cdot \delta_i\%$, where $\delta_i$ is the percentage price change of the item i (i.e. 20% when $\delta_i$ is 0.20), if substitutable items have an average price change of $100 \cdot \mu_i\%$, where $\mu_i$ is the average percentage price change of the substitutable items; $Q_{B_i}$ is the units of current sales of item i at the current price when substitutable items are also at current prices; $E_i$ is the price elasticity of demand of item i at the current base price; and K is price elasticity of demand for the category of substitutable items (in most instances, K is inelastic, i.e. more than negative one).

According to embodiments, $Q_i$ comprises the forecasted sales of item i after price changes within the category of substitutable items. Equation 4 expresses these forecasted sales as the product of three factors. A first factor, $Q_{B_i}$, indicates the current units of item i at the current price when substitutable items are at current prices. This indicates, for example, the number of units of an item at the moment the calculation is done, before any price changes, within the category, where all items are at current prices. According to embodiments, this does not include promotional pricing, only regular price changes.

A second factor, the direct effect factor $\exp(E_i \delta_i)$, expresses an exponential change in units based on a price change for the modeled item. The exponential expression comprises the elasticity of demand for the item ($E_i$) and the percentage price change of the item ($\delta_i$). According to embodiments, the elasticity may be estimated by the multiplication of a price sensitivity and the current price of the item. The direct effect factor indicates, for example, whether the sales of an item will increase or decrease based on the percentage price change of the item. The elasticity indicates how much sales change in response to changes in price. To determine the percentage change in sales based on the direct effect factor, demand planner 110 may calculate the product of the direct effect factor multiplied by one hundred and then subtract one hundred (i.e. (direct effect factor*100)−100=percentage increase or decrease in sales). According to embodiments, this indicates the percentage change of sales of the considered item based on the average price change of all items in the category and the category elasticity minus the item's own elasticity. For example, if the direct effect factor equals 1.1, this indicates a 10% increase in sales ((1.1*100)−100=10), whereas if the direct effect factor equals 0.9, this indicates a sales decrease of 10% ((0.9*100)−100=−10).

The third factor, the cross-effect factor $\exp[(K - E_i)\mu_i]$, expresses an exponential change in units based on interactions between the item and other items in the same category. The exponential expression comprises the elasticity of demand for the category minus the elasticity of demand for the considered item and the average price change for items in the category. The cross-effect factor indicates, for example, whether the sales of an item will increase or decrease based on the interaction of items in the category and the average price change of the category. According to some embodiments, substitutable items will give or take units to the considered item at the speed of their group elasticity less the item elasticity multiplied by their average price change of the substitutable items. Similarly to the direct effect factor, to determine the percentage change in sales based on the cross-effect factor, demand planner 110 may calculate the product of the cross-effect factor multiplied by one hundred and then subtract one hundred (i.e. (cross-effect factor*100)−100=percentage increase or decrease in sales). According to embodiments, this indicates the percentage of increase or decrease of sales of the considered item based on the average price change of all other items in the category and the category elasticity minus the item's own elasticity. For example, a cross-effect factor of 1.3 indicates an increase of sales of 30% ((1.3*100)−100=30), whereas a cross-effect factor of 0.8 indicates a decrease in sales of 20% ((0.8*100)−100=−20).

Importantly, the disclosed model includes a cross price effect to maintain category containment when every price decreases at the same time. Without category containment, sales of an item calculated by a pricing model may increase without any capacity containment, even though demand is necessarily constrained to some capacity of consumption and storage. Using the disclosed model, however, if every price in the category is lowered by 50%, each individual item will not increase sales to excessively high numbers. Instead, when one product drops its price and is highly demanded, the model limits the demand for the product.

In addition, or as an alternative, the disclosed model considers cannibalization, or the effect of one item stealing sales from another item. Cannibalization may occur when a new product is introduced that reduces sales of another existing product or when a product reduces its base price and take sales from other substitutes perceived of lesser value. For example, when a name brand cola beverage company introduced a new zero-calorie cola beverage into the market, the new product stole more sales from the company's existing diet soda than from competitors in the marketplace.

In addition, the disclosed model considers the halo effect, which is the effect of increasing sales of another product when the price of a complementary product is decreased. For example, a complementary effect may occur between sausages and buns, so if one is promoted, shoppers will buy the sausage and the buns that goes with them, so there will be a halo effect if the retailer promotes the sausages with the buns. Therefore, the sales of buns will go up even though the buns were not promoted, and the buns will go up as fast as if they were promoted. This effect may also be noticed with base price reduction.

According to embodiments, items that are calculated according to the disclosed model may be placed in the same categories or sub-classes. Substitutable items may be grouped in the same category when the increase in the price of an item causes the demand for another item to increase. On the other hand, items that are complementary may be grouped in the same category where items are placed in the category when a reduction of price in one item causes the demand for this item and another item to increase.

According to other embodiments, the disclosed model may determine changes in demand for an item caused by a price change in another item, even when the items are in different categories. For example, if the price of milk greatly decreases, shoppers may additionally purchase almond milk, now that they can afford it. Accordingly, the price of almond milk would change. And even if the price went down a small amount, based on the larger budget, the shopper may still purchase more items.

Figure 3:
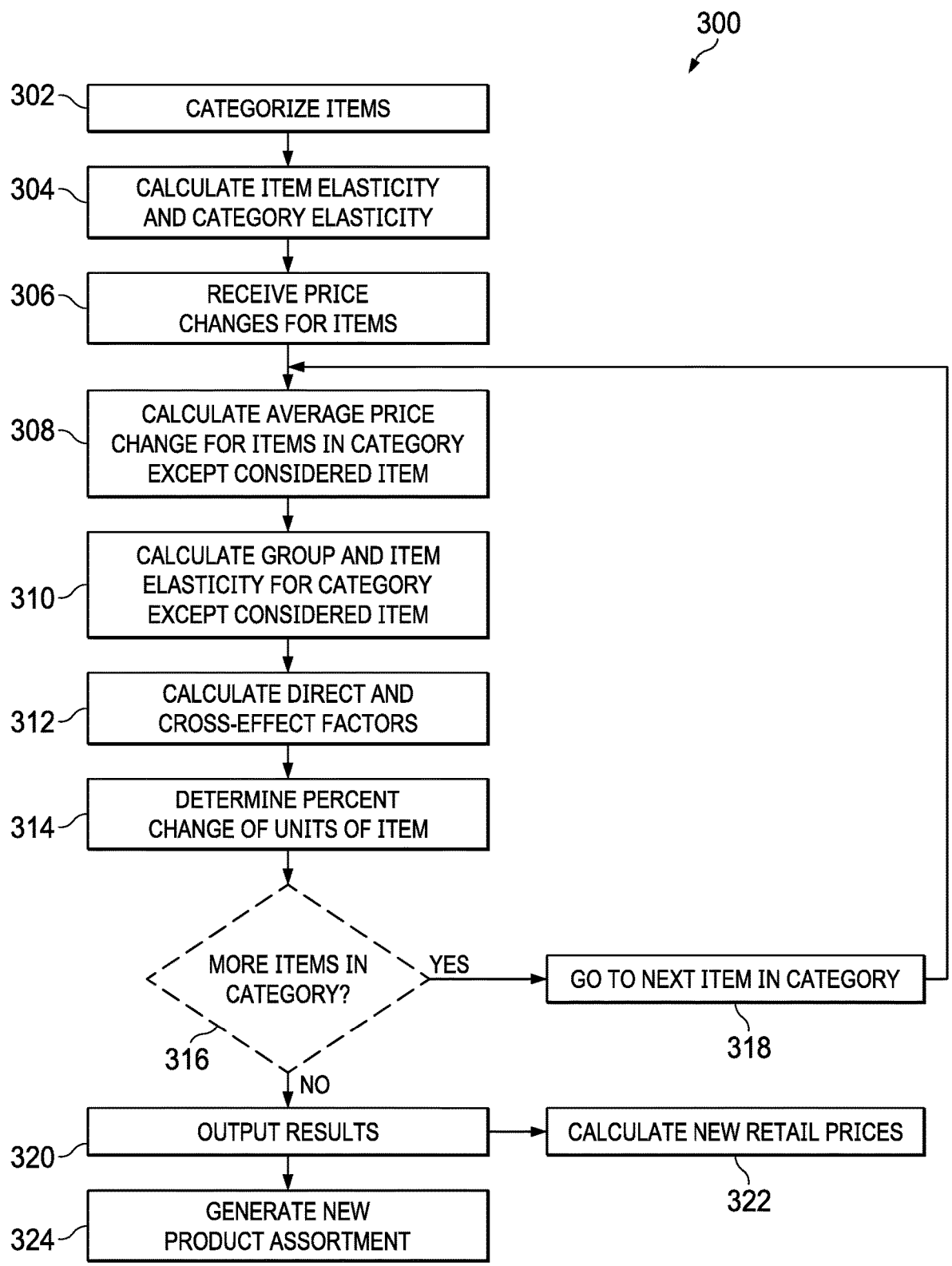
FIG. 3 illustrates a method of demand planning, according to an embodiment.

FIG. 3 illustrates an exemplary method 300 of demand planning according to an embodiment. The following method 300 proceeds by one or more activities, which, although described in a particular order, may be performed in one or more combinations, orders, repetitions, or permutations according to particular needs. Method 300 begins at activity 302 where demand planner 110 may categorize items into a category based on substitutability. According to some embodiments, the category may comprise a group of similar retail items, such as groceries, clothing, consumer goods, food products, pharmaceuticals, automobiles, or the like.

At action 304, demand planner 110 may calculate the elasticity of demand for each item and for the category as a whole. Demand planner 110 may derive the category elasticity from the item elasticity of one or more (or all) items in the category. According to embodiments, demand planner 110 determines category elasticity from the theory of consumer surplus (i.e., the log sum of the exponential of the utility) that provides for deriving the category elasticity from each individual item elasticity. Specifically, the category elasticity may be computed from assuming that the price of every item in the category drops by $100 \cdot \delta_i \%$. From the direct model structure, the expansion of the category due to this price decrease is computed with:

$$\rho = \frac{\text{Ln}[Q_c(\text{final})]}{\text{Ln}[Q_c(\text{current})]} \quad (5)$$

where $Q_c(\text{final})$ is the final category quantity of items sold in the category after every item price has changed and $Q_c(\text{current})$ is the current category quantity of items sold in the category.

This expansion rate can be directly predicted from:

$$\rho = \frac{\text{Ln}\left[\sum_{i=1}^{N} Q_i \cdot \exp(E_i \delta_i)\right]}{\text{Ln}[Q_c(\text{current})]} \quad (6)$$

where N is the number of items in the category and $Q_i$ is the current number of units sold for item i and $E_i$ is the price elasticity of demand at the current base price for item i, and where $\delta_i$ is the percentage price change of the item i.

The category elasticity can be approximated to:

$$K \cong \frac{(\rho - 1)]}{\delta_i} \quad (7)$$

Figure 4:
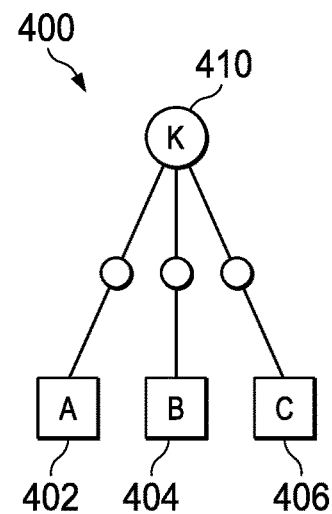
FIG. 4 illustrates a pyramid diagram of category elasticity for an exemplary category comprising three exemplary products, according to an embodiment.

FIG. 4 illustrates pyramid diagram 400 of category elasticity for an exemplary category comprising three exemplary products, according to an embodiment. Pyramid diagram 400 illustrates an architecture of product interaction due to price for Product A 402, Product B 404, and Product C 406 which are all items in a single category. In this architecture, each of Product A 402, Product B 404, and Product C 406 influence the category average price, and the category average price, in turn, influences each of the individual products, Product A 402, Product B 404, and Product C 406. This architecture shows that the individual price changes affect the collective price change of the category, and the collective price change influences the perceived price of the individual items. This architecture provides decreased complexity than models based on cross elasticities, which, as described above, scales quadratically at $n^2-n$ for a group of n products and may produce asymmetric results. The pyramid architecture simplifies the disclosed model, makes it more robust, and more scalable.

Continuing with the above example of demand planning and at action 306, demand planner 110 may receive percent pricing changes for each item with a pricing change in the category. According to embodiments, demand planner 110 may calculate the percent pricing change based on pricing data received from one or more supply chain entities 150, a database, or other external source. At action 308, for a first item, demand planner 110 calculates the mean percent pricing change for the category without the considered item. According to embodiments, demand planner 110 calculates the mean percent pricing change by, excluding the considered item and dividing the sum of all percent pricing changes for the category of items by the number of items in the category. At action 310, demand planner 110 calculates the elasticity of demand for the category without the considered item. According to embodiments, the category elasticity without the considered item is determined by subtracting the item elasticity from the category elasticity.

At action 312, demand planner 110 calculates the direct effect factor and cross-effect factor for the item according to the model of Equation 4, above. At action 314, demand planner 110 calculates the percent change in units for the considered item according to the model of Equation 4, above. At action 316, demand planner 110 determines whether the change in units needs to be calculated for other items in the category due to a pricing change. If the change in units is needed to be calculated for other items, demand planner 110 selects the next item and returns to action 308. If the change in units is not needed to be calculated for other items, method 300 continues to action 320 where demand planner 110 generates the results of the calculations. Method 300 may continue to action 322, where pricing module 202 of demand planner 110 calculates new retail prices for one or more items based, at least in part, on a forecasted change in sales quantity of an item based on a pricing change of the item or one or more substitutable items. In addition, or as an alternative, method 300 may continue to action 324 where demand planner 110 may generate a new product assortment 324 based, at least in part, on the forecasted change in sales quantity of an item based on a pricing change of the item or one or more substitutable items.

Figure 5:
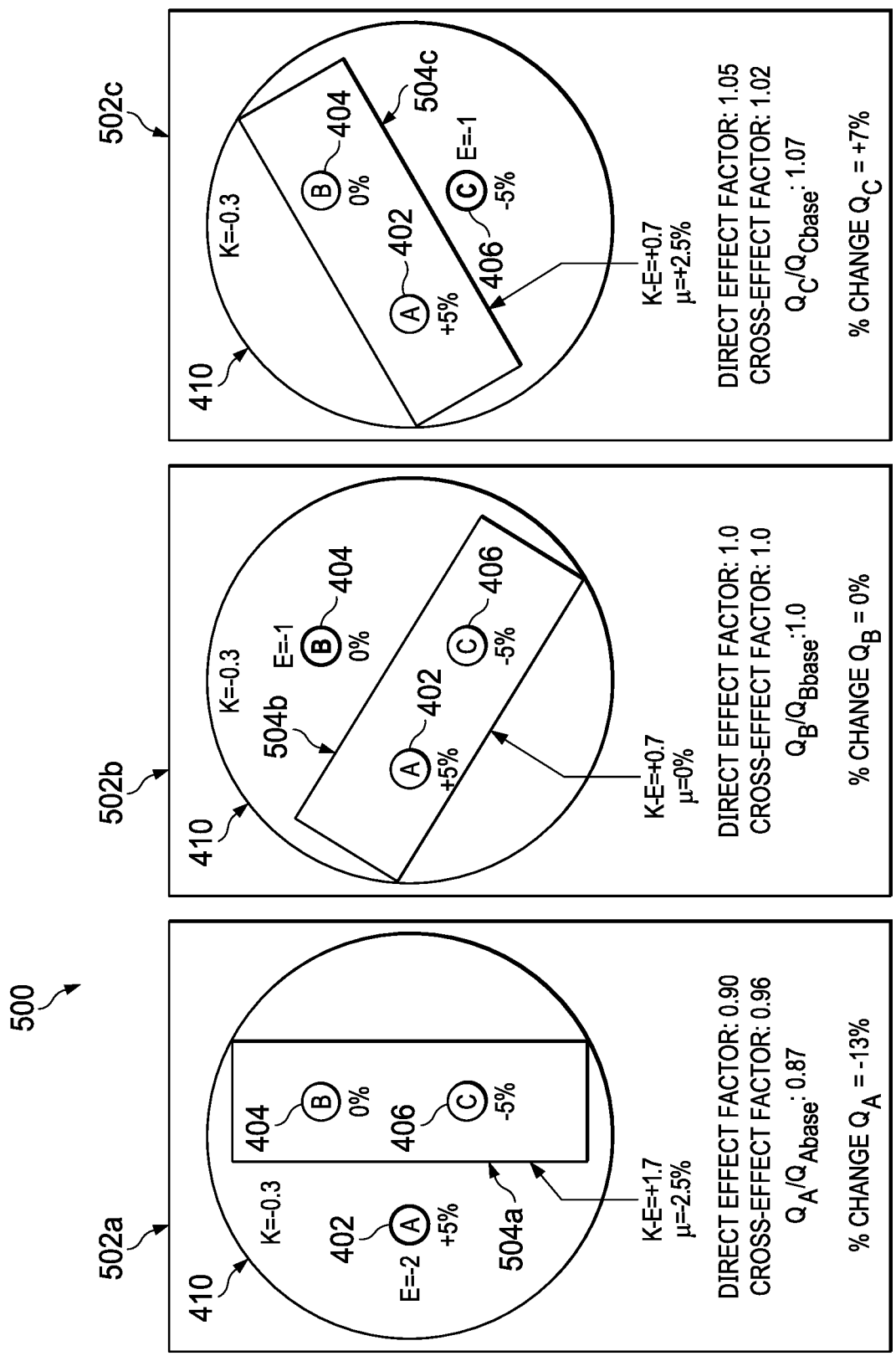
FIG. 5 illustrates a chart of the impact of price changes on sales of the three exemplary products of the exemplary category of FIG. 4, according to an embodiment.

To further illustrate the disclosed method 300 of demand planning, another example is now given. In the following example, FIG. 5 illustrates chart 500 of the impact of price changes on sales of the three exemplary products of the exemplary category of FIG. 4, according to an embodiment. According to embodiments, pricing relationship chart 500 comprises three panels 502a-502c illustrating an exemplary category 410 comprising three exemplary items: Product A 402, Product B 404, and Product C 406, all members of a single exemplary category 410. Each of the three panels 502a-502c comprise a representation of the calculations of actions 308-314 of method 300, which demand planner 110 may repeat for each item in a category. Because the exemplary category 410, comprises three products (Product A 402, Product B 404, and Product C 406), when determining the change in sales for the products of the exemplary category, demand planner 110 may need to repeat actions 308-314 three times (once for each product), as described in more detail below.

Additionally, each of the three panels 502a-502c comprise boxes 504a-504c. Boxes 504a-504c illustrate substitutable products for the product under consideration. For example, as described in more detail below, first panel 502a illustrates the calculations when Product A 402 is the product under consideration. Accordingly, box 504a illustrates that Product B 404 and Product C 406 are the substitutable products when Product A 402 is the product under consideration. Similarly, box 504b in panel 502b illustrates that Product A 402 and Product C 406 are substitutable products when Product B 404 is the product under consideration, and box 504c in panel 502c illustrates that Product A 402 and Product B 404 are substitutable products when Product C 406 is the product under consideration.

Demand planner 110 may determine the change in sales for the products of the illustrated example using method 300 of demand planning. As discussed above and in connection with method 300 of demand planning, at action 302, demand planner 110 may receive a category comprising one or more items in the category. The exemplary category 410, comprises three items: Product A 402, Product B 404, and Product C 406. By way of an example only, and not by way of limitation, if, for example, the exemplary category 410, represents types of spaghetti sauce at a grocery store, Product A 402, Product B 404, and Product C 406 may represent particular brands, flavors, or types of spaghetti sauce. However, although the exemplary category is described as spaghetti sauce at a grocery store and the products are described as brands, flavors, or types of spaghetti sauce, embodiments contemplate any retail products categorized into any suitable category, according to particular needs, as discussed above.

Additionally, the described example comprises three items in a single category, however, a retail setting often comprises, for example, from 50 to 300 items categorized into each of more than three-hundred categories of products. By way of example, and not by way of limitation, categories for a grocery store may comprise categories for each different food item such as pastas, yogurts (which may be separated into different categories for fat-free versus regular-fruit yogurt), soups, cereal, soft drinks, or other food items. Furthermore, as described above, other supply chain entities 150 or different retailers 158 (such as a clothing retailer or a home improvement store) may choose different categories based on the interactions of items sold by that particular entity. Embodiments contemplate retailers categorizing items based on any suitable attribute to appropriately group substitutable items in the same category, sub-category, class, or sub-class of substitutable products, according to particular needs.

At action 304, demand planner 110 may calculate the item elasticity for each item in the category and the category elasticity for the category containing the items. In this example, the category elasticity is determined to be −0.3 (K=−0.3), and the elasticities for Product A 402, Product B 404, and Product C 406 are −2, −1, and −1, respectively. In general, most categories of items are moderately inelastic, indicating that the sales of items in the category do not grow or contract wildly in relation to price changes.

At action 306, demand planner 110 may receive or calculate percent pricing changes for each item in the category. For the exemplary example, the received or calculated percent pricing changes for Product A 402, Product B 404, and Product C 406 are determined to be 5%, 0%, and −5%, respectively.

Continuing with this example, first panel 502*a* illustrates various values used to calculate the percent change of units of Product A 402 based on price changes to the other items in the category according to actions 308-314. At activity 308, demand planner 110 calculates the mean percent price change for the category, excluding the considered item. In first panel 502*a*, Product A 402 is the considered item. The mean percent price change for the category excluding Product A 402 is −2.5% ((0%+−5%)/2=−2.5%). At activity 310, demand planner 110 may calculate the category elasticity without the considered item, again, Product A 402. The category elasticity without Product A 402 is determined to be 1.7 (−0.3−−2=1.7). At action 312, demand planner 110 may calculate the direct and cross-effect factors. The direct effect factor is determined to be 0.90 (exp(−2*0.05=0.90). This indicates that the sales of Product A 402 will decrease by 10% due to the 5% price increase of Product A 402 and its own elasticity of −2. The cross-effect factor is determined to be 0.96 (exp[(−0.3−−2)*−0.025]=0.96). This indicates that Product A 402 will lose sales to Products B and C based on the pricing changes to the category. Although this does not indicate the proportion of sales lost to Product A 402 that will go to Products B and C, it indicates that Product A 402 will lose 4% of sales to Products B and C based on the pricing changes to the category. At action 314, demand planner 110 calculates the percent change in units of Product A 402 based on price changes in the category. Demand planner 110 calculates the ratio of the number of the units of Product A 402 after the category price changes divided by the number of units of Product A 402 before the category price changes. Here, the ratio of change for Product A 402 is calculated as 0.87 (0.90*0.96=0.87). Based on this ratio, demand planner 110 calculates that the percentage change of units of Product A 402 based on the price changes to the category is −13% ((0.87*100)−100=−13). This indicates that based on the pricing changes to the category, sales of Product A 402 will be reduced by 13%. Method 300 continues to activity 316 where demand planner 110 determines that there are more items in the category (i.e. Product B 404 and Product C 406). At activity 318, demand planner 110 moves to the next item in the category, Product B 404, and returns to activity 308.

Continuing with this example, second panel 502*b* illustrates various values used to calculate the percent change of units of Product B 404 based on price changes to other items in the category according to actions 308-314. At action 308, demand planner 110 calculates the mean percent price change for the category, excluding the considered item. For second panel 502*b*, Product B 404 is the considered item. The mean percent price change for the category excluding Product B 404 is 0% ((5%+−5%)/2=0%). At activity 310, demand planner 110 may calculate the category elasticity without the considered item, again, Product B 404. The category elasticity without Product B 404 is determined to be 0.7 (−0.3−−1=0.7). At action 312, demand planner 110 may calculate the direct and cross-effect factors. The direct effect factor is determined to be 1.0 (exp(−1*0)=1.0). This indicates that the sales of Product B 404 will remain unchanged, which is expected because the price of Product B 404 was unchanged. The cross-effect factor is determined to be 1.0 (exp(0.7*0)=1.0). This indicates that sales of Product B 404 will not lose or gain sales from Products A and C based on the pricing changes to the category. At action 314, demand planner 110 calculates the percent change in units of Product B 404 based on price changes in the category. Demand planner 110 calculates the ratio of the number of the units of Product B 404 after the category price changes divided by the number of units of Product B 404 before the category price changes. Here, the ratio of change for Product B 404 is calculated as 1.0 (1.0*1.0=1.0). Based on this ratio, demand planner 110 calculates that the % change of units of Product B 404 based on the price changes to the category is 0% ((1.0*100)−100=0). This indicates that based on the pricing changes to the category, sales of Product B 404 will not change.

This example illustrates that even though the prices changed for Product A 402 (+5%) and Product C 406 (−5%), the price change for the category as a whole remains unchanged. This negates the effects of the price change on the sales of Product B 404. Additionally, the price of Product B 404 remains unchanged. Therefore, the direct effect factor and the cross-effect factor indicate that the sales of Product B 404 will remain unchanged. However, if by way of an alternate example, the price change for Product A 402 had been +5% and the price change for Product C 406 had been −10%, sales of Product B 404 would have been lost to Product A 402 and Product C 406 because the mean percent price change for the category excluding Product B 404 would have been −2.5% ((5%+−10%)/2=−2.5%). Because this indicates a drop in the average price of substitutes, Product A 402 and Product C 406 would attract sales from Product B 404 even though the price of Product B 404 did not change. Therefore, in this example, the direct effect for Product B 404 will still be 1.0, but the cross-effect factor calculated for Product B 404 indicates that sales will leave Product B 404 for Product A 402 and C 406.

After determining the percent change in units of Product B 404, method 300 continues to activity 316 where demand planner 110 determines that there are more items in the category (i.e. Product C 406). At activity 318, demand planner 110 moves to the next item in the category, Product C 406, and returns to activity 308.

Continuing with this example, third panel 502*c* illustrates various values used to calculate the percent change of units of Product C 406 based on price changes to other items in the category. At activity 308, demand planner 110 calculates the mean percent price change for the category, excluding the considered item. For third panel 502*c*, Product C 406 is the considered item. The mean percent price change for the category excluding Product C 406 is +2.5% ((5%+0%)/2=2.5%).

At activity 310, demand planner 110 may calculate the category elasticity without the considered item, again, Product C 406. The elasticity of the group of substitutes is determined to be 0.7 (−0.3−−1=0.7). At activity 312, demand planner 110 may calculate the direct and cross-effect factors. The direct effect factor is determined to be 1.05 (exp (−1*−0.05)=1.05). This indicates that the sales of Product C 406 will grow by 5%. The cross-effect factor is determined to be 1.02 (exp(0.7*0.025)=1.02). This indicates that sales of Product C 406 will gain sales from Product A 402 and Product B 404 based on the pricing changes to the category.

At action 314, demand planner 110 calculates the percent change in units of Product C 406 based on price changes in the category. Demand planner 110 calculates the ratio of the number of the units of Product C 406 after the category price changes divided by the number of units of Product C 406 before the category price changes. Here, the ratio of change for Product C 406 is calculated as 1.07 (1.05*1.02=1.07). Based on this ratio, demand planner 110 calculates that the % change of units of Product C 406 based on the price changes to the category is 7% ((1.07*100)−100=7). This indicates that based on the pricing changes to the category, sales of Product C 406 will increase by 7%.

Although the actions of demand planner 110 in the above example for Product A 402, Product B 404, and Product C 406 were described as discrete calculations, embodiments contemplate calculating any or all of the calculations simultaneously. For example, continuing with the example just given, for exemplary category 410, comprising Product A 402, Product B 404, and Product C 406, a matrix may be constructed that relates the changes in prices on Product A 402, Product B 404, and Product C 406 to the percentage change in sale or units of the items. When the prices on Product A 402, Product B 404, and Product C 406 change by a particular amount, the matrix may indicate the resulting changes in sales for each item in the category.

After demand planner 110 generates the calculations at action 320, demand planner 110 may calculate new prices for one or more retail items at action 322 and/or generate a new product assortment at action 324.

According to embodiments, modeler 204 of demand planner 110 linearizes the disclosed model around a current price of an item to enable LP optimization for a business objective under business rules and constraints. The linearized models may be used by demand planner 110 (or a price optimizer) to generate prices for one or more retail items that maximize a business objective, such as revenue or gross margin.

Although the model is complex with many interactions, embodiments may be linearized based on several considerations. The first consideration is that the rate of the elasticity may be bounded from −0.3 to −3.5 in, for example, the US market. These elasticities may be determined empirically based on the market for retailers. Additionally, base prices rarely change more than 10%. Based on these considerations, approximations may be included in the equation and then the equation is rewritten as a linear expression of the percent price change of the item under consideration and the average price change of the category. When further items are considered and used with the approximation, the model may be expressed so that basic LP optimization solvers may be used to formulate the objective function.

When the elasticity in base prices is between −0.3 and −3.5 and the maximum individual base price change falls below 10% ($|E_i \delta_i| < 1$ and $|(E_i - K)\mu| < 1$), the disclosed model and the objective function may be linearized by a first order approximation ($e^x \sim 1+x$):

$$Q_i \approx Q_{B_i} \cdot (1 + E_i \delta_i) \cdot [1 + (K - E_i)\mu_i] \qquad (8)$$

Finding optimal prices to maximize revenue around current base prices reduces to a linear approximation, in Equation 9:

$$\mathcal{R} = \sum_{i=1}^{N} (a_i + b_i \cdot P_i) \qquad (9)$$

where $a_i = -\mathbb{R}_i E_i + A$, $b_i = \dfrac{1}{\mathbb{P}_i}[\mathbb{R}_i (1 + E_i) - s_i \cdot A]$, $A = \sum_{i=1}^{N} \mathbb{R}_i \cdot (E_i - K)\left(1 + \dfrac{1}{E_i}\right)$, $s_i = \dfrac{Q_{Bo}}{Q_T}$ and $\mathbb{R}_i = Q_{Bi} \cdot \mathbb{P}_i$ where $s_i$ is the market share of item i and $Q_T$ is the total units sold in the category, where $Q_T = \Sigma_j^N Q_{Bj}$.

According to embodiments, demand planner 110 uses the linearized model to calculate prices for one or more items that maximizes revenue received from sales of the items. Furthermore, Equation 4, described above, may be linearized as an exponential model comprising several pieces. In addition, or as an alternative, the linearized model may be simplified to only two pieces: the collective items within the category and the items that are being considered.

According to embodiments, solver 208 encodes an objective function for the optimization problem to maximize revenue, profit, or another business objective as a sum of the linear model. Solver 208 may then solve the optimization problem and generate prices for each item in the category considered by the optimization model and its constraints. According to embodiments, solver 208 may further maximize one or more of sales, dollar sales, and profit for a category, and possibly combination of these or other objectives. Because the optimization problem is based on a model that includes category containment, prices generated from the optimization problem are more accurate than those calculated according to other models, such as multinomial logit models. By way of example and not by limitation, assuming a butter/margarine category contained three products (Store-Brand Butter, Name-Brand Butter, and Name-Brand Margarine) and a price increase for the Name-Brand Butter of 5%, sales in the butter/margarine category would likely not change much. Instead, the category may contract moderately, which may be reflected in the category elasticity of the disclosed model. Other models, however, cannot accurately model or predict behavior when categories expand or contract moderately. They either exhibit no changes at the category level (such as, for example, zero sum game models, including a multinomial logit model) or extreme variations (such as, for example, the independent item models).

According to embodiments, optimization problem comprises one or more constraints to constrain prices so that they incorporate product interactions, direct effect factors, cross-effect factors, and respect margin, size, brand, and competitor prices constraints. According to embodiments, retailers set prices for one or more items based on business rules, business constraints, demands, or other like considerations, such as for example, trade contracts with manufacturers, regulations (such as for alcoholic beverages and cars) which may be vastly different based on location, the profit margin the retailer establishes on their products, and other like factors. Regarding business constraints, one such constraint may comprise, for example, setting the price of a large size of an item higher than a small size of the same item. By way of example and not by limitation, a large 20 oz. jar or pasta sauce sold at a grocery store may be restricted by business constraints to always cost more than a 10 oz. jar of pasta sauce, which helps prevent shopper dissatisfaction caused by unexpected pricing of a 20 oz. jar of pasta sauce costing less than a 10 oz. jar of pasta sauce. Regarding regulation constraints, it may be illegal, for example, to sell an item below its cost in some locations. Therefore, prices for particular products may be constrained at a minimum price, whereas in other locations, regulations do not prevent items from being sold for less than cost. For example, if a retailer sells a gallon of milk in a store in the United States for 20% less than cost, this will likely be seen by consumers as a great deal and drive up sales for that store. However, in locations where selling below cost is illegal, the cost of the item may represent a hard constraint on the minimum sales price of the item.

Although various constraints are described, embodiments of demand planner 110 contemplate determining product price levels without constraints or business rules. Instead, embodiments of demand planner 110 incorporate business constraints and rules into a pricing plan during price optimization. According to these embodiments, the price elasticity and the dynamic of the disclosed model indicate how shoppers will react to price changes for an item.

According to embodiments, demand planner 110 generates new product assortments by determining whether to add a product to a product assortment, remove a product from a product assortment, or leave the product assortment unchanged. A product assortment may be determined by calculating the changes in sales of other products based on the introduction or removal of an item from a product assortment. According to embodiments, the disclosed model provides for determining substitutable demand in an item assortment. By modeling a price increase of a substitutable item to infinity, the model quantifies the sales transferred to every other item. Conversely, when the price elasticity of a new item is known, demand planner 110 may project the sales and transferred sales caused by adding the new item to the category. Accordingly, the disclosed model may be used by an assortment planner to determine whether to add to, remove from, or leave unchanged items in a product assortment based on the calculated changes in sales or demand.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for planning and executing a product assortment based on a sales forecast without using a cross elasticity, comprising:
   interconnecting over a network a demand planner, an inventory system, a transportation network and one or more communication devices, the demand planner further comprising a pricing module, a modeler, a categorization module and a solver;
   scanning one or more products by an imaging sensor of the one or more communication devices to identify the one or more products and to receive inventory information of the one or more products;
   receiving global positioning satellite location information and inventory information associated with one or more transportation vehicles, while the one or more transportation vehicles are in transit;
   receiving the inventory information into the inventory system over the network from the one or more communication devices and from the one or more transportation vehicles;
   receiving, by the pricing module over the network, a percentage pricing change for at least two substitutable products associated with the inventory information in a supply chain network comprising one or more supply chain entities, and the at least two substitutable products are grouped in a same product category and at least one of the at least two substitutable products is grouped in a product assortment;
   calculating, by the modeler, an average percent pricing change for the product category comprising the at least two substitutable products and a direct effect factor and cross-effect factor for each of the at least two substitutable products;
   identifying, by the categorization module, a product of the at least two substitutable products to be removed from the product assortment based, at least in part, on a substitutable demand calculated by modeling a price increase of a substitutable product to infinity and in response to removing the identified product of the at least two substitutable products from the product assortment, calculating, by the modeler, a price change for at least one product in the same product category as the identified product;
   linearizing, by the modeler, an exponential pricing model around a current price of at least one of the at least two substitutable products;
   optimizing, by the solver executed by the demand planner, a price for the at least one of the at least two substitutable products according to an objective function that satisfies different constraints;
   controlling, by the demand planner, automated machinery to produce at least one of the at least two substitutable products; and
   directing one or more of the one or more transportation vehicles connected to the transportation network to ship products between one or more supply chain entities according to the optimized price.

2. The computer-implemented method of claim 1, wherein the direct effect factor is based, at least in part, on a price change of a considered product of the at least two substitutable products and an elasticity of the considered product.

3. The computer-implemented method of claim 2, wherein the cross-effect factor is based, at least in part, on at least one price change of a product in the same product category as the considered product and a category elasticity.

4. The computer-implemented method of claim 3, further comprising:
   monitoring one or more values of one or more product attributes for one or more products in the same product category; and
   in response to detection of a modified value of the one or more product attributes, automatically recalculating substitutability between at least two products in the same product category.

5. The computer-implemented method of claim 4, wherein the pricing model comprises category containment for sales price changes of products in the same product category.

6. A networked system for planning and executing a product assortment based on a sales forecast without using a cross elasticity, comprising:
   a demand planner comprising a pricing module, a modeler, a categorization module and a solver, an inventory system, a transportation network and one or more communication devices which are interconnected over a network and configured to:
   scan one or more products by an imaging sensor of the one or more communication devices to identify the one or more products and to receive inventory information of the one or more products:
   receive global positioning satellite location information and inventory information associated with one or more transportation vehicles, while the one or more transportation vehicles are in transit;

receive the inventory information into the inventory system over the network from the one or more communication devices and from the one or more transportation vehicles;

receive a percentage pricing change, by the pricing module over the network, for at least two substitutable products associated with the inventory information in a supply chain network comprising one or more supply chain entities, and the at least two substitutable products are grouped in a same product category and at least one of the at least two substitutable products is grouped in a product assortment;

calculate, by the modeler, an average percent pricing change for the product category comprising the at least two substitutable products and a direct effect factor and cross-effect factor for each of the at least two substitutable products;

identify, by the categorization module, a product of the at least two substitutable products to be removed from the product assortment based, at least in part, on a substitutable demand calculated by modeling a price increase of a substitutable product to infinity and in response to removing the identified product of the at least two substitutable products from the product assortment, calculate, by the modeler, a price change for at least one product in the same product category as the identified product;

linearize, by the modeler, an exponential pricing model around a current price of at least one of the at least two substitutable products;

optimize, by the solver executed by the demand planner, a price for the at least one of the at least two substitutable products according to an objective function that satisfies different constraints;

control, by the demand planner, automated machinery to produce at least one of the at least two substitutable products; and direct one or more of the one or more transportation vehicles connected to the transportation network to ship products between one or more supply chain entities according to the optimized price.

7. The networked system of claim 6, wherein the direct effect factor is based, at least in part, on a price change of a considered product of the at least two substitutable products and an elasticity of the considered product.

8. The networked system of claim 7, wherein the cross-effect factor is based, at least in part, on at least one price change of a product in the same product category as the considered product and a category elasticity.

9. The networked system of claim 8, wherein the networked system is further configured to:

monitor one or more values of one or more product attributes for one or more products in the same product category; and in response to detection of a modified value of the one or more product attributes, automatically recalculate substitutability between at least two products in the same product category.

10. The networked system of claim 9, wherein the pricing model comprises category containment for sales price changes of products in the same product category.

11. A non-transitory computer-readable medium embodied with software, the software when executed configured for planning and executing a product assortment based on a sales forecast without using a cross elasticity by:

scanning one or more products by an imaging sensor of the one or more communication devices to identify the one or more products and to receive inventory information of the one or more products;

receiving global positioning satellite location information and inventory information associated with one or more transportation vehicles, while the one or more transportation vehicles are in transit;

receiving the inventory information into an inventory system over a network from the one or more communication devices and from the one or more transportation vehicles;

receiving a percentage pricing change, by a pricing module of a demand planner over the network, for at least two substitutable products associated with the inventory information in a supply chain network comprising one or more supply chain entities, and the at least two substitutable products are grouped in a same product category and at least one of the at least two substitutable products is grouped in a product assortment;

calculating, by a modeler of the demand planner, an average percent pricing change for the product category comprising the at least two substitutable products and a direct effect factor and cross-effect factor for each of the at least two substitutable products;

identifying, by a categorization module of the demand planner, a product of the at least two substitutable products to be removed from the product assortment based, at least in part, on a substitutable demand calculated by modeling a price increase of a substitutable product to infinity and in response to removing the identified product of the at least two substitutable products from the product assortment, calculating, by the modeler, a price change for at least one product in the same product category as the identified product;

linearizing, by the modeler of the demand planner, an exponential pricing model around a current price of at least one of the at least two substitutable products;

optimizing, by the solver of the demand planner, a price for the at least one of the at least two substitutable products according to an objective function that satisfies different constraints;

controlling instructing, by the demand planner, automated machinery to produce at least one of the at least two substitutable products; and directing one or more of the one or more transportation vehicles connected to the transportation network to ship products between one or more supply chain entities according to the optimized price.

12. The non-transitory computer-readable medium of claim 11, wherein the direct effect factor is based, at least in part, on a price change of a considered product of the at least two substitutable products and an elasticity of the considered product.

13. The non-transitory computer-readable medium of claim 12, wherein the cross-effect factor is based, at least in part, on at least one price change of a product in the same product category as the considered product and a category elasticity.

14. The non-transitory computer-readable medium of claim 13, wherein the software is further configured to:

monitor one or more values of one or more product attributes for one or more products in the same product category; and in response to detection of a modified value of the one or more product attributes, automatically recalculate substitutability between at least two products in the same product category.

* * * * *